United States Patent Office.

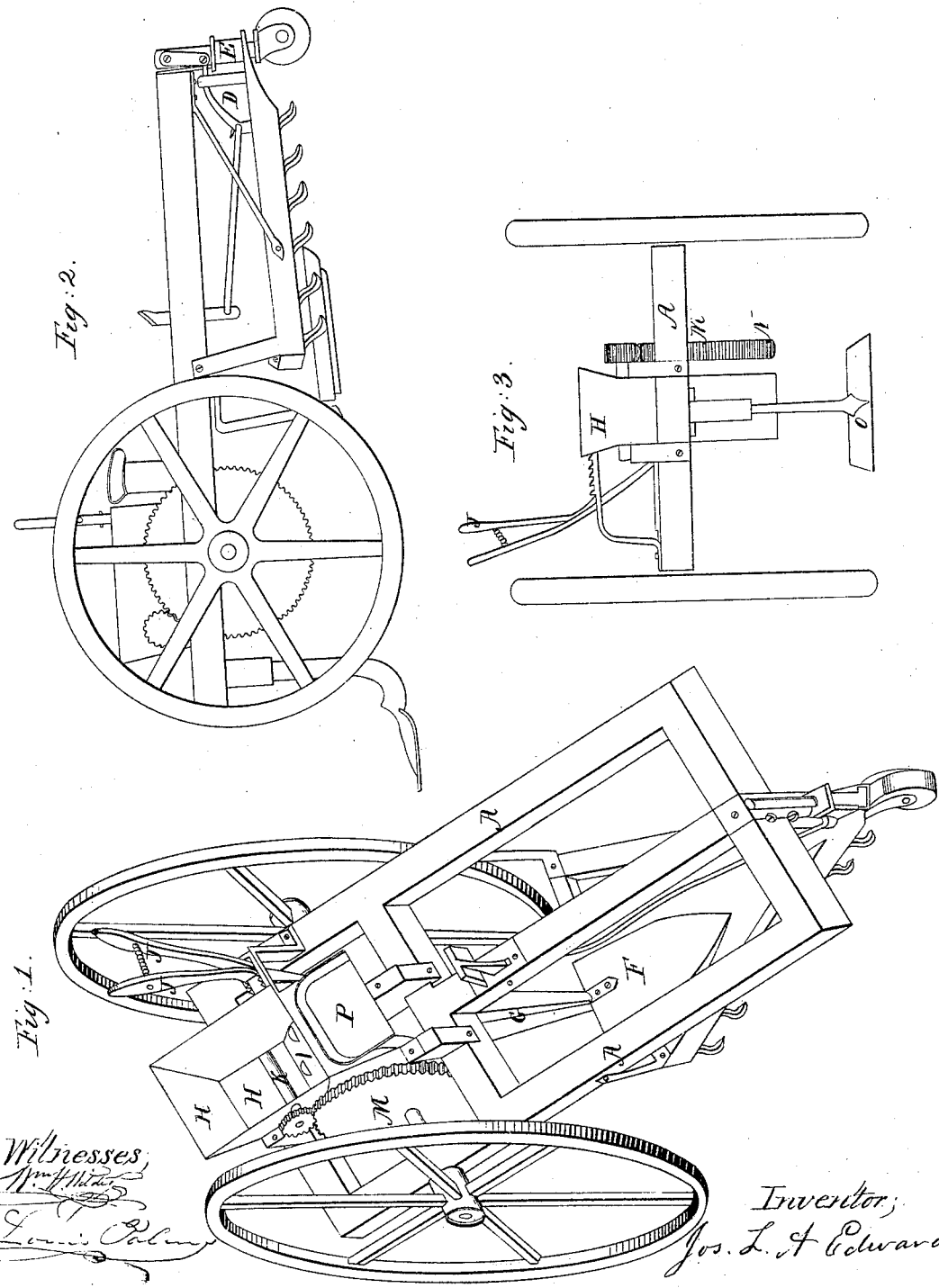

JOSEPH L. A. EDWARDS, OF NEW ORLEANS, LOUISIANA

Letters Patent No. 63,623, dated April 9, 1867.

IMPROVEMENT IN COTTON PLANTER.

The Schedule referred to in these Letters Patent and making part of the same.

Be it known that I, JOSEPH L. A. EDWARDS, of the city of New Orleans, State of Louisiana, have invented a new and improved Cotton Planter; and I do hereby declare that the following is a full, clear, and exact description of said machine, together with its construction and operation of the same, reference being had to the annexed drawings, making a part of this specification, in which—

Figure 1 is a perspective view.
Figure 2, a longitudinal elevation
Figure 3, a traverse section.

Letter A is the frame to which the different parts are attached. B is a roller placed directly in front of the harrow C, and is attached to frame A, and between shafts D E is a brake, operating on roller B in such a manner that by pressing with the foot the roller is pressed down and raises harrow C in case of obstruction. C is a harrow, the teeth of which are in shape of cultivators. F is a groover or trencher that follows in the rear of the harrow and prepares a trench for the reception of the seed, which is discharged through funnel-box G in rear of the groover. H is a box into which the seed is placed that supply G. I is a drum-wheel, on which are sunk holes of sufficient size and capacity to receive the seed and pass them into funnel-box G as the machine is drawn along. J is a brake, to throw the drum-wheel I out of gearing. K is a shaft, on which are spurs to agitate the seed in box H. To this shaft is attached, on outside, a pinion-wheel, L, which acts on spur-wheel M. M is the spur that drives the drum-wheel I. This spur acts also on pinion N. N is a pinion, to the shaft of which is attached a brush to keep the seed from remaining in the drum-wheel. O is a coverer or scraper fixed to the machine in the rear of the groover and funnel-box to cover over the seed as planted. P is the seat for the driver of the horse attached to the machine. Thus, when the machine is in motion, one part operating on the other, the soil is prepared, the trench made, the seed sown in ridges, and it is then covered, the whole work performed.

Having thus described the construction and operation of the machine in all its parts, I claim, and do claim—

1. The employment of the roller B, in connection with the separate parts, substantially as and for the purpose set forth.

2. The arrangement of the holes on the drum-wheel I, and the arrangement of the wheel, substantially as and for the purposes set forth.

3. The combination of the harrow C, the groover F, the seed-box G, and the scraper or coverer O, as also the agitator K and brush N, substantially as and for the purposes set forth.

4. The arrangement of the devices above claimed, all constructed and operating substantially as and for the purposes described.

JOS. L. A. EDWARDS.

Witnesses:
W. H. WILDER,
LOUIS PALMER.